United States Patent
Börjeson et al.

(10) Patent No.: US 9,358,943 B2
(45) Date of Patent: Jun. 7, 2016

(54) SIDE AIRBAG FOR INSTALLATION INTO A MOTOR VEHICLE, VEHICLE SEAT WITH SUCH A SIDE AIRBAG AND MOTOR VEHICLE

(75) Inventors: Gustav Börjeson, Alingsås (SE); Peter Henricsson, Västra Frölunda (SE); Erik Sandwall, Alingsås (SE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 13/810,250

(22) PCT Filed: Jul. 5, 2011

(86) PCT No.: PCT/SE2011/050909
§ 371 (c)(1),
(2), (4) Date: Jan. 15, 2013

(87) PCT Pub. No.: WO2012/008904
PCT Pub. Date: Jan. 19, 2012

(65) Prior Publication Data
US 2013/0113193 A1 May 9, 2013

(30) Foreign Application Priority Data
Jul. 15, 2010 (DE) .......................... 10 2010 027 401

(51) Int. Cl.
*B60R 21/231* (2011.01)
*B60R 21/207* (2006.01)
(Continued)

(52) U.S. Cl.
CPC ............... *B60R 21/23* (2013.01); *B60R 21/207* (2013.01); *B60R 21/231* (2013.01);
(Continued)

(58) Field of Classification Search
CPC ................ B60R 21/207; B60R 21/231; B60R 21/23138; B60R 2021/23153; B60R 2021/23146; B60R 2021/23161
USPC ........... 280/730.2, 728.2, 740.1, 743.1, 730.1
See application file for complete search history.

(56) References Cited

U.S. PATENT DOCUMENTS 5,222,761 A 6/1993 Kaji et al.
5,251,931 A 10/1993 Semchena et al.
(Continued)

FOREIGN PATENT DOCUMENTS

DE 102008015228 A1 10/2008
GB 2309440 A 7/1997
(Continued)

OTHER PUBLICATIONS

International Search Report and Written Opinion of the ISA for PCT/SE2011/050909, ISA/SE, Stockholm, mailed Oct. 11, 2011.

*Primary Examiner* — Keith Frisby
(74) *Attorney, Agent, or Firm* — Stephen T. Olson; Harness, Dickey & Pierce, P.L.C.

(57) ABSTRACT

A side airbag for installation into a motor vehicle, a vehicle seat with such a side airbag and a motor vehicle with such a vehicle seat are described. The side airbag comprises at least one mounting device for mounting the side airbag on the backrest of the vehicle seat, an outer skin with a first side wall extending forwards, when viewed in the vehicle direction, and a second side wall connected to the first side wall. In order to be able, at as low a cost as possible, to protect the passengers to be protected better against a movement towards the middle of the vehicle, the second side wall extends essentially cross-ways to the vehicle direction when the outer skin is fully deployed and free from external forces, so that at least a third side wall connecting the first two side walls is present.

22 Claims, 7 Drawing Sheets

(51) Int. Cl.
*B60R 21/23* (2006.01)
*B60R 21/233* (2006.01)
*B60R 21/2338* (2011.01)

(52) U.S. Cl.
CPC .............. *B60R 21/23138* (2013.01); *B60R 2021/23146* (2013.01); *B60R 2021/23161* (2013.01); *B60R 2021/23308* (2013.01); *B60R 2021/23382* (2013.01); *B60R 2021/23386* (2013.01)

(56) References Cited

U.S. PATENT DOCUMENTS

| | | | |
|---|---|---|---|
| 5,492,361 A * | 2/1996 | Kim | 280/730.1 |
| 5,743,554 A * | 4/1998 | Friedrich et al. | 280/730.1 |
| 5,899,490 A * | 5/1999 | Wipasuramonton et al. | 280/730.2 |
| 6,142,521 A * | 11/2000 | Shephard | 280/748 |
| 6,199,900 B1 * | 3/2001 | Zeigler | 280/735 |
| 7,338,070 B2 * | 3/2008 | Madasamy et al. | 280/730.2 |
| 7,396,042 B2 * | 7/2008 | Mabuchi et al. | 280/730.2 |
| 7,594,678 B2 * | 9/2009 | Schedler | 280/743.2 |
| 7,717,459 B2 * | 5/2010 | Bostrom et al. | 280/730.1 |
| 7,971,901 B2 * | 7/2011 | Tomitaka et al. | 280/730.2 |
| 2009/0001695 A1 * | 1/2009 | Suzuki et al. | 280/730.2 |
| 2011/0049852 A1 * | 3/2011 | Kibat et al. | 280/743.2 |
| 2011/0074141 A1 | 3/2011 | Wipasuramonton et al. | |
| 2013/0093224 A1 * | 4/2013 | Dainese et al. | 297/216.12 |

FOREIGN PATENT DOCUMENTS

| | | | | |
|---|---|---|---|---|
| GB | 2357999 A | | 7/2001 | |
| JP | 2000103310 A | * | 4/2000 | ............ B60R 21/22 |
| WO | WO-2007065650 | | 6/2007 | |

* cited by examiner

SIDE AIRBAG FOR INSTALLATION INTO A MOTOR VEHICLE, VEHICLE SEAT WITH SUCH A SIDE AIRBAG AND MOTOR VEHICLE

CROSS-REFERENCE TO RELATED APPLICATIONS

This application is a 371 U.S. National Stage of International Application No. PCT/SE2011/050909, filed Jul. 5, 2011, which claims priority to German Patent Application No. 10 2010 027 401.1, filed Jul. 15, 2010. The disclosures of the above applications are incorporated herein by reference.

TECHNICAL FIELD OF THE INVENTION

The invention relates to a side airbag for installation into a motor vehicle, a vehicle seat with such a side airbag and a motor vehicle with such a vehicle seat.

Side airbags are in widespread use in vehicle safety technology. They are usually arranged either in a side cheek of a vehicle seat facing outwards, i.e. towards the vehicle internal structure, or in the side structure of the motor vehicle, and inflate in the event of a detected relevant accident, in particular a side crash, between the vehicle passengers to be protected and the vehicle internal structure, in order to prevent the vehicle passenger from striking against the vehicle internal structure. In the inflated state, such side airbags essentially extend in the vehicle longitudinal direction, wherein the side airbags comprise two side walls being essentially parallel to one another, wherein the side wall facing the passenger forms the impact surface and the opposite side wall forms the support surface. As a rule, such side airbags are so-called "2D-airbags", i.e. airbags wherein the two side walls are directly connected to one another via an edge region.

The movement of the passenger towards the centre of the vehicle can of course not be prevented by such a side airbag. Vehicle seats with a side airbag have therefore been proposed, wherein said side airbag is located in the side cheek of the vehicle seat facing inwards, so that this side airbag inflates in case of need on the vehicle inner side of the vehicle passenger. The side airbag extends, like another side airbag also, essentially in the longitudinal direction of the vehicle. Such side airbags usually have the problem that they do not find suitable support without further measures and can therefore offer only a small degree of side support for the passenger.

PRIOR ART

On the one hand, an attempt has been made to solve the problem of the lack of side support with outwardly lying tethers, but this involves the drawback of costly assembly. Such a side airbag is described for example in GB 2357999 A.

It has further been proposed to provide a side airbag on the inside on each of two adjacent backrests; both side airbags have to be ignited in order that the side airbags mutually offer a certain degree of support. Such a system is proposed for example by GB 2309440 A. This also has several drawbacks: on the one hand, the desired side support can hardly be achieved, especially when the adjacent vehicle seat is not occupied, and on the other hand it necessitates the presence and simultaneous ignition of two side airbags. This is disadvantageous, inasmuch as each additional airbag naturally means additional vehicle weight and each airbag inflated during an accident involves considerable additional repair costs. Finally, the two adjacent side airbags can ideally support against one another only when the adjacent seats are adjusted essentially identically.

SUMMARY OF THE INVENTION

Proceeding from this, the present invention poses the problem of improving the prior art in such a way that good protection against a passenger movement towards the middle of the vehicle is provided, wherein the additional weight and the repair costs in the event of an accident are to be kept as low as possible. Furthermore, the side airbag should offer good protection irrespective of the seat occupancy. In the case of use in seats separated from one another, especially in the case of front seats in a passenger car, the safety system should further work properly irrespective of the individual seat adjustment.

According to the invention, a side airbag with two side walls is used, wherein the latter, when the side airbag is completely deployed, but free from external forces, do not extend parallel to one another, but enclose a relatively large angle, in particular of 90° or more. This means that the side airbag is usually not a 2D airbag, but rather a 3D airbag, which as a rule is produced from at least three cuttings, and that a third side wall must be present which connects the first two side walls to one another.

As a result of the chosen design, the side airbag can in particular supports itself on an adjacent backrest, so that it is possible, in particular, that only one such side airbag is required, which gives rise to the aforementioned advantages in respect of vehicle weight and incurred repair costs. A further advantage is that a side airbag constructed according to the invention can easily be constituted such that—especially in the case of the use of separate, adjacent seats—it "automatically seeks" its necessary support according to the circumstances, irrespective of the specific situation (in particular the adjustment and occupancy of the seats).

Preferred embodiments of the invention are defined in the sub-claims, as well as in the embodiments of the invention represented in greater detail by reference to the figures.

DETAILED DESCRIPTION OF PREFERRED EMBODIMENTS

Two embodiments of the invention are described below, wherein the first embodiment relates in particular to the case where two seats are present which are arranged beside one another, but essentially independent of one another. This is especially the case in the front seat row of motor vehicles, but can also relate to rear seat rows with individual seats.

The second embodiment of the invention relates to the use in a seat bench, in particular a rear seat bench of a motor vehicle.

Figure 1:
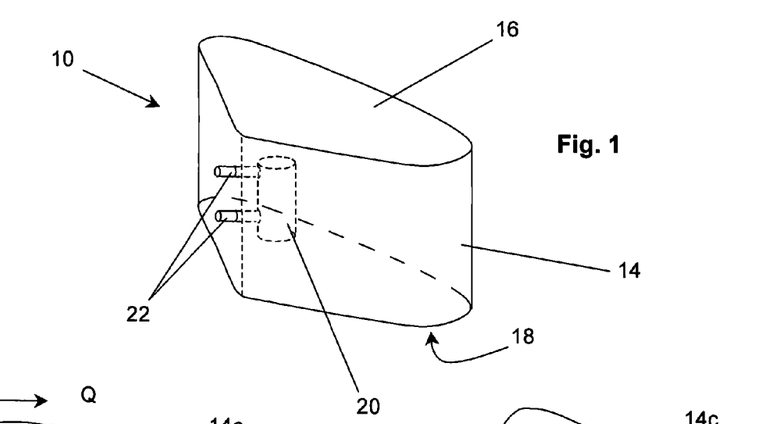
FIG. 1 shows a first embodiment of a side airbag according to the invention in a schematic, perspective view.
Figure 2:
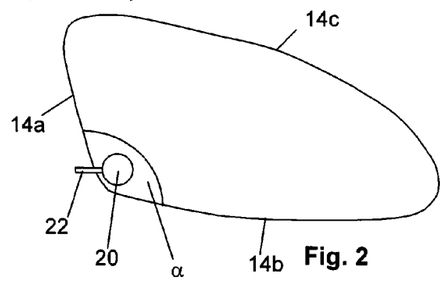
FIG. 2 shows the side airbag from FIG. 1 in a horizontally running cross-section.

FIGS. 1 and 2 show a representation of a side airbag according to the invention, wherein FIG. 2 shows a horizontal cross-section through the representation in FIG. 1. Side airbag 10 comprises an outer skin 12 and a gas generator 20, from which bolts 22 for mounting the side airbag extend through the outer skin 12. The outer skin 12 comprises when viewed geometrically—and as a rule also physically—three parts, i.e. a lateral surface 14, whose surface normals essentially lie in the horizontal plane, and two caps 16 and 18, whose surface normals lie essentially vertically. "Horizontal" and "vertical" is understood here to mean the situation with an installed and fully deployed outer skin 12, wherein the precise position naturally depends on the position of the backrest. The outer skin 12 encloses in a common way a gas compartment in which the gas generator 20 serving as an inflator is disposed.

In FIG. 2 the arrow L indicates (in the installation situation) the vehicle longitudinal direction and the double arrow Q indicates the vehicle transverse directions. It can be seen especially from FIG. 2 that the lateral surface 14 has an essentially triangular cross-section (which is imposed upon it by the two caps 16, 18), so that the lateral surface 14 is divided into three side walls, i.e. the first side wall 14$a$, the second side wall 14$b$ and the third side wall 14$c$. First side wall 14$a$ and second side wall 14$b$ extend essentially from the mounting device of the side airbag, i.e. from the region in which the bolts 22 of the gas generator 20 pass through the lateral surface 14. That is to say that the first side wall 14$a$ and the second side wall 14$b$ meet in the region of the side cheek of the backrest in which the side airbag 10 is installed. The third side wall 14$c$, which connects the first wall 14$a$ and the second wall 14$b$, lies essentially opposite the mounting device, i.e. the bolts 22. It can directly be seen in FIG. 2 that the first side wall 14$a$ extends from the mounting device essentially forward in the vehicle longitudinal direction, but in a slightly slanting way, and that the second side wall 14$b$ extends essentially in a vehicle transverse direction. The effect of this is that the inner angle $\alpha$ between the first side wall 14$a$ and the second side wall 14$b$ is greater than 90°, here approx. 120°. Furthermore, it can be seen from FIG. 2 that the second side wall 14$b$ is longer than the first side wall 14$a$.

Figure 3:
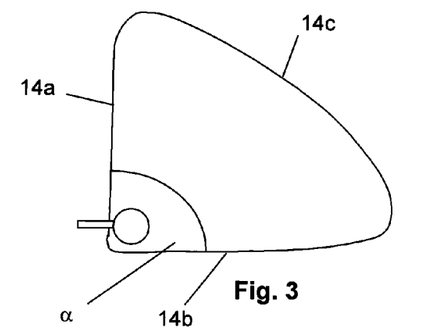
FIG. 3 shows a second example of embodiment of the first embodiment of the invention in a representation corresponding to FIG. 2.

FIG. 3 shows a second example of embodiment, wherein the first side wall 14$a$ essentially extends precisely in the vehicle longitudinal direction L and the second side wall 14$b$ essentially extends precisely in vehicle transverse direction Q. As a result, the cross-section of the outer skin 12 is essentially a right-angled isosceles triangle, i.e. a "quarter slice of cake".

Figure 4:
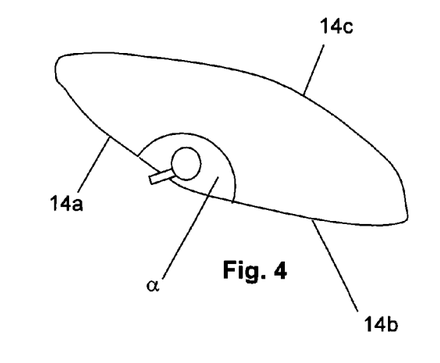
FIG. 4 shows a third example of embodiment of the first embodiment of the invention in a representation corresponding to FIG. 2.

FIG. 4 shows a third example of embodiment, wherein the inner angle $\alpha$ between first side wall 14$a$ and second side wall 14$b$ is very large and close to 180°, so that the third side wall 14$c$ is roughly as long as the sum of the first two side walls 14$a$ and 14$b$.

Figure 5:
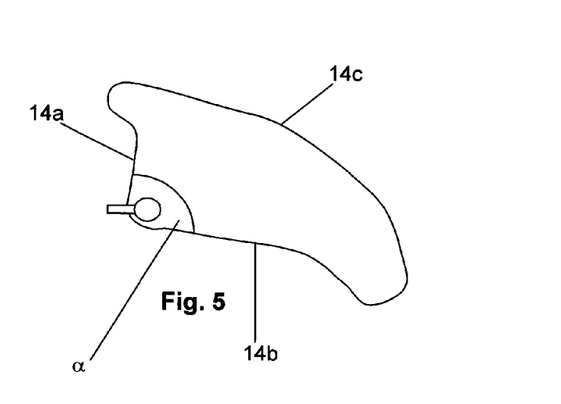
FIG. 5 shows a fourth example of embodiment of the first embodiment of the invention in a representation corresponding to FIG. 2.

FIG. 5 shows a fourth example of embodiment, in which it can be seen, on the one hand, that the cross-sectional shape of the outer skin 12 can also be more complex and that, on the other hand, the second side wall 14$b$ can even extend somewhat backwards, which, as will be seen later, is often preferred.

Figure 6:
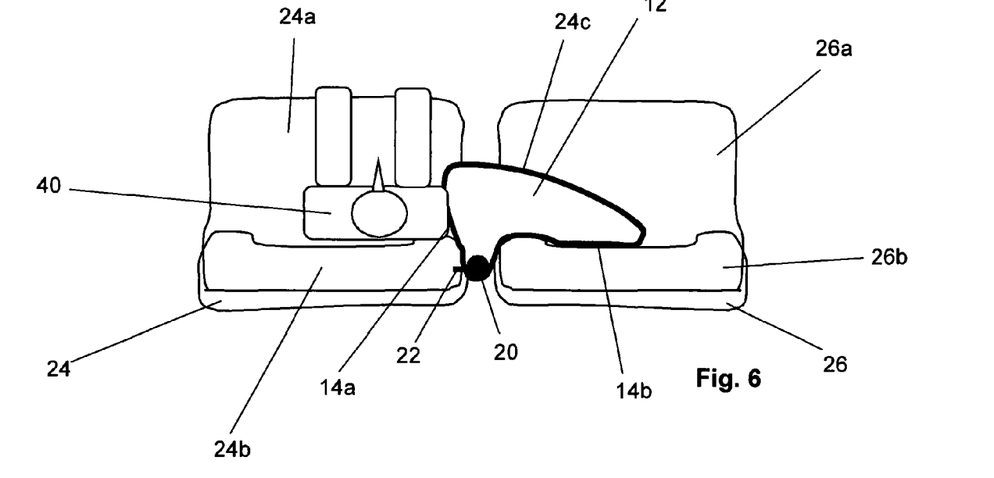
FIG. 6 shows the assembled side airbag from FIGS. 1 and 2 with a completely deployed outer skin in the case of protection of a passenger sitting on the left-hand side.

FIG. 6 shows the side airbag from FIGS. 1 and 2 in the installed and completely deployed state in the case of an impact from the right with the presence of a passenger 40 sitting on a left-hand seat 24.

As has already been mentioned, the embodiment of the invention relates to an installation situation with two adjacent vehicle seats, i.e. a left-hand vehicle seat 24, which for example can be the driver's seat, and a right-hand vehicle seat 26, which can for example be the front passenger seat. The left-hand vehicle seat 24 as usual comprises a seat cushion 24$a$ and a backrest 24$b$, and likewise the right-hand vehicle seat 26 with a seat cushion 26$a$ and a backrest 26$b$. As can be seen directly from FIG. 6 and also from FIG. 7, only one side airbag 10 is present, as has been previously described, and the latter is connected with its bolts 22 serving as a mounting device to the seat frame of the inner cheek of one of the two vehicle seats 24, 26, i.e. the left-hand vehicle seat 24 here. A further side airbag acting between the two seats 24, 26 is not provided, nor is it required.

FIG. 6 shows the situation with vehicle seats 24, 26 adjusted essentially parallel to one another in the case of a side crash from the right, wherein only the left-hand vehicle seat 24 (which can be the driver's seat) is occupied by a passenger 40. It can be seen that the second side wall 14$b$ extends up to the backrest 26$b$ of the right-hand vehicle seat 26 and is supported on the latter, i.e. forms the support surface, whereas the first side wall 14$a$ forms the impact surface for the passenger 40 sitting on the left-hand side.

Figure 7:
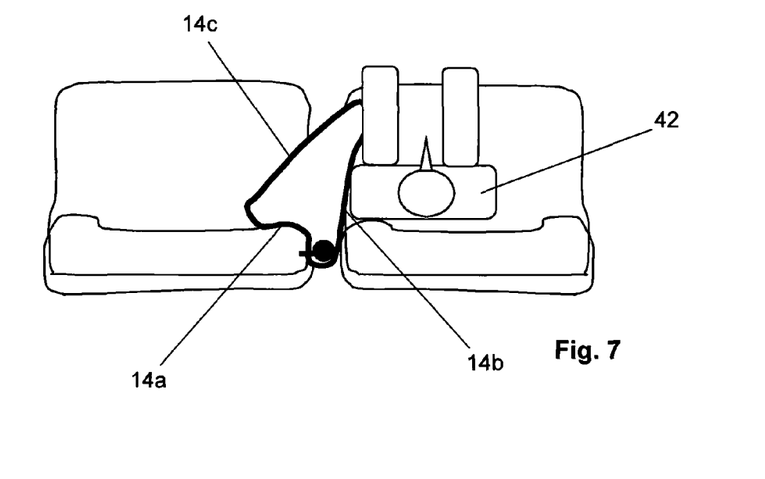
FIG. 7 shows the side airbag from FIG. 6 in the case of protection of a passenger sitting on the right-hand side.

FIG. 7 shows the situation depicted in FIG. 6 in the case of a side impact from the left, wherein a passenger 42 is present only on the right-hand vehicle seat 26 (in the case of a left-hand drive vehicle, this can of course only occur in practice with separated individual seats at the back of the motor vehicle). It can be seen that the outer skin 12 is tilted counterclockwise essentially by 90°, so that the outer skin 12 of the side airbag 10 is in this case supported by its first side wall 14$a$, i.e. on the backrest 24$b$ of the left-hand vehicle seat 24, and that the second side wall 14$b$ forms the impact surface. First side wall 14$a$ and second side wall 14$b$ have exchanged their function as compared to the situation depicted in FIG. 6. This takes place "automatically", i.e. without any additional active control, depending on the accident situation.

Figure 8:
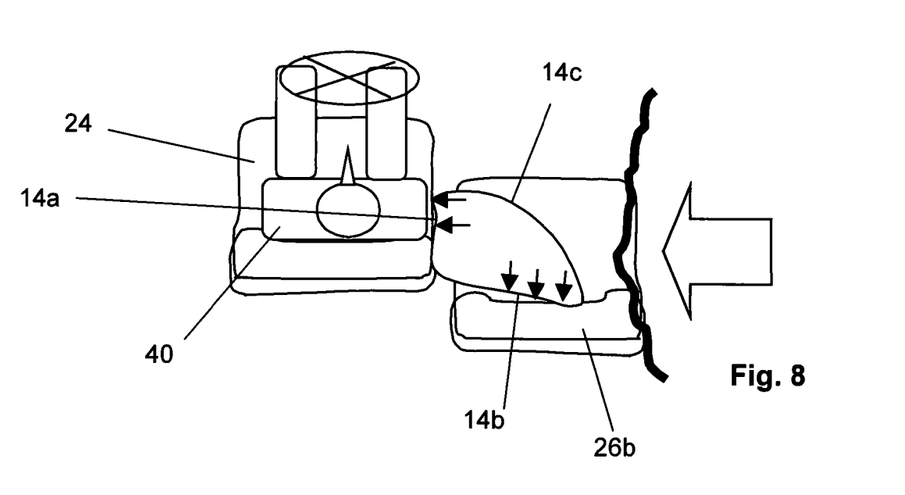
FIGS. 8-10 show essentially the situation depicted in FIG. 6 with different seat positions.
Figure 9:
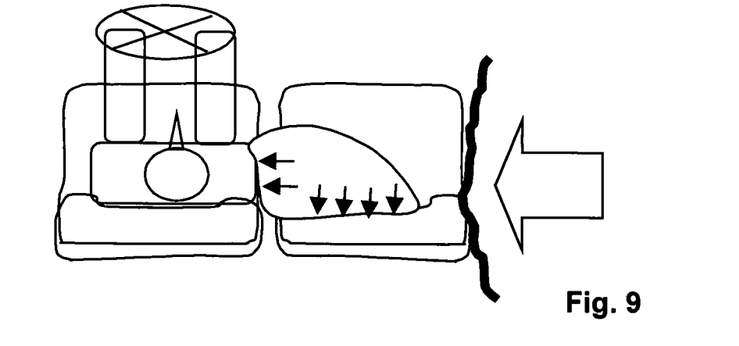
Figure 10:
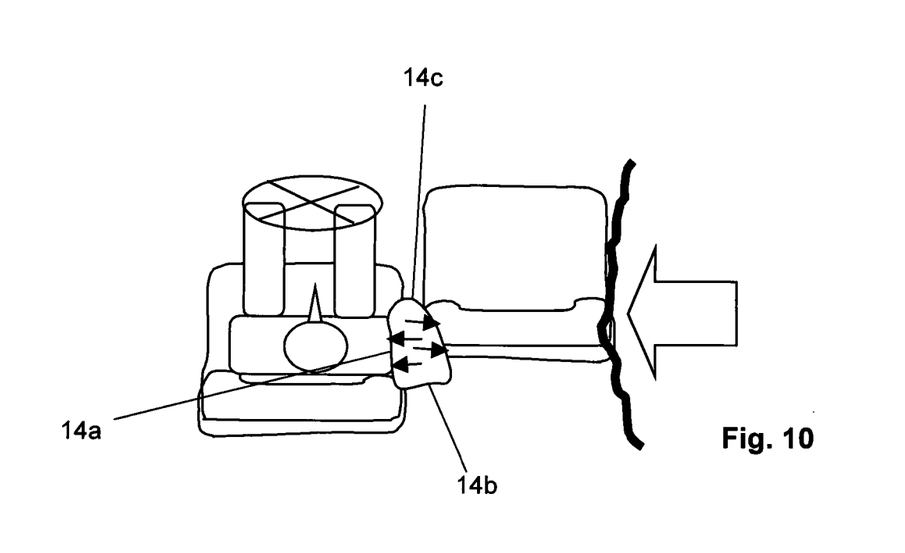

FIGS. 8 to 10 essentially show the situation depicted in FIG. 6 with different adjustments of the two vehicle seats 24, 26 with respect to one another, also in the case of an impact from the right. In the adjustments of FIGS. 8 and 9 (right-hand vehicle seat 26 farther back than left-hand vehicle seat 24 or vehicle seats at the same height), the first side wall 14$a$ forms the impact surface and the second side wall 14$b$ the support surface. It can be seen from FIG. 8 that it may often be advantageous if the second side wall 14$b$ extends somewhat backwards. In the case shown in FIG. 10, i.e. when the right-hand vehicle seat 26 is positioned relatively well in front of left-hand vehicle seat 24, a part of third side wall 14c can also function as support surface. Furthermore, the side airbag 10 often does not reach its complete volume in this case.

Figure 11:
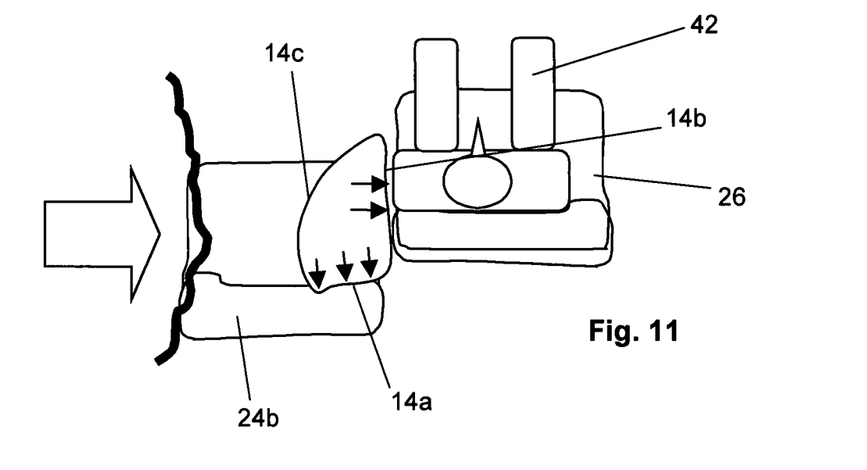
FIGS. 11-13 show essentially the situation depicted in FIG. 7 with different seat positions.
Figure 12:
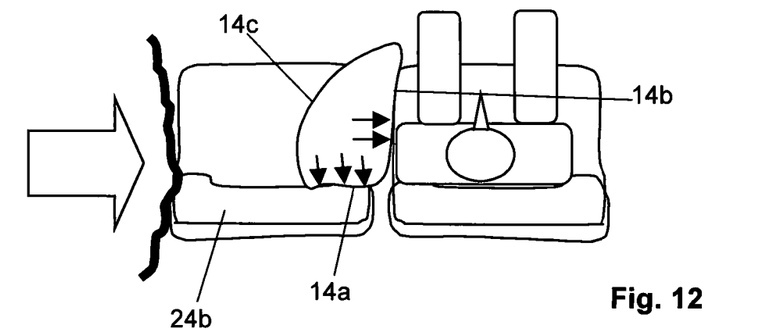
Figure 13:
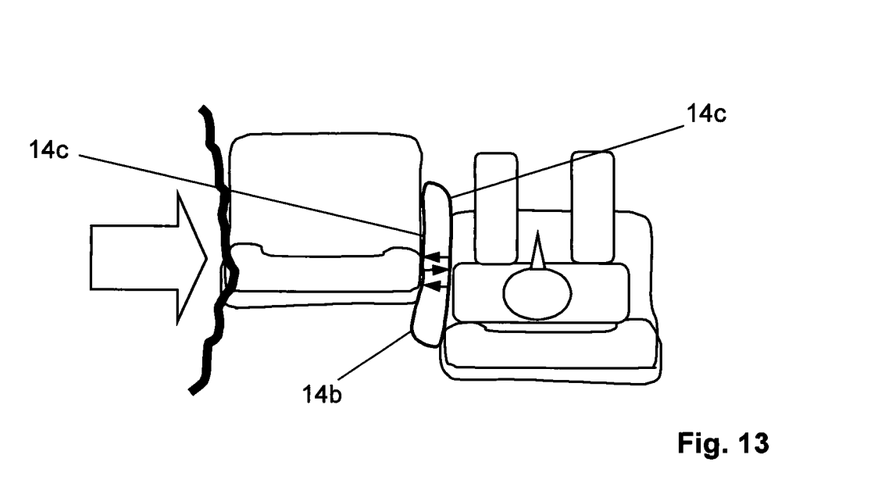

FIGS. 11 to 13 show the situation depicted in FIG. 7 with different seat adjustments, also in the case of an impact from the left. In the adjustments of FIGS. 11 and 12 (right-hand vehicle seat 26 farther forward than left-hand vehicle seat 24 or vehicle seats at the same height), the first side wall 14a forms the support surface and the second side wall 14b forms the impact surface. In the case shown in FIG. 13, i.e. when the left-hand vehicle seat 24 is located relatively well in front of the right-hand vehicle seat, a part of the third side wall 14c can serve as the impact surface.

Figure 14:
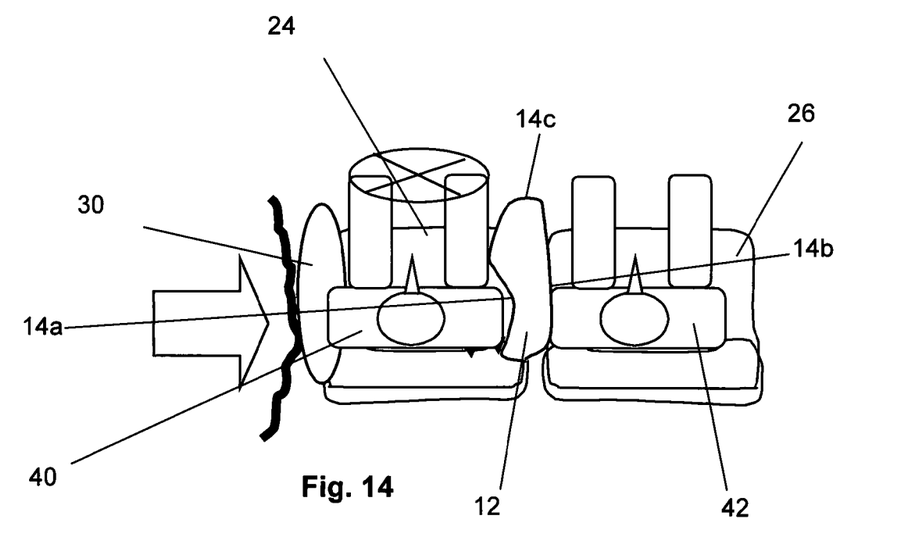
FIGS. 14-15 show an accident situation with two passengers sitting beside one another.
Figure 15:
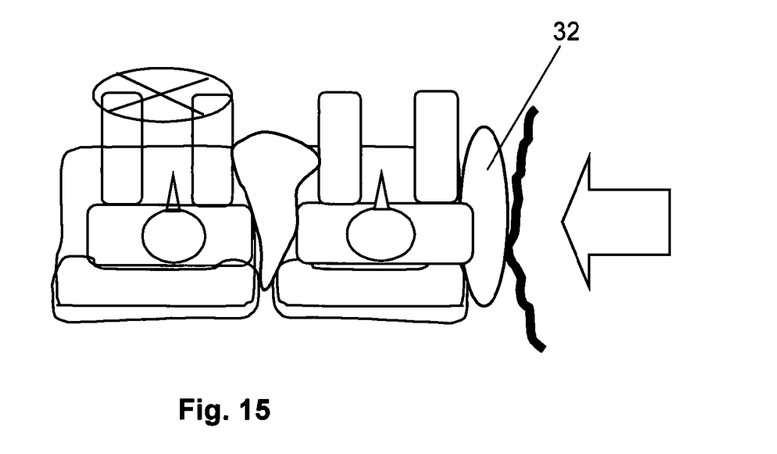

FIGS. 14 and 15 show situations with two passengers, wherein FIG. 14 shows the situation in the case of a side impact from the left and FIG. 15 shows the situation in the case of a side impact from the right. If both seats are occupied, at least a part of the transfer of force can also take place via the person sitting beside. It can also be seen from FIGS. 14 and 15 that "normal" side airbags (left-hand side airbag 30 and right-hand side airbag 32) are usually of course also present.

It is a characteristic of the first embodiment just described that the outer skin 12 of the side airbag 10 automatically seeks its suitable support surface and different areas of the lateral surface can serve both as an impact surface and as a support surface, depending of the accident situation. Furthermore, it is typical that the first side wall 14a and the second side wall 14b extend away from the mounting region of the airbag.

Figure 16:
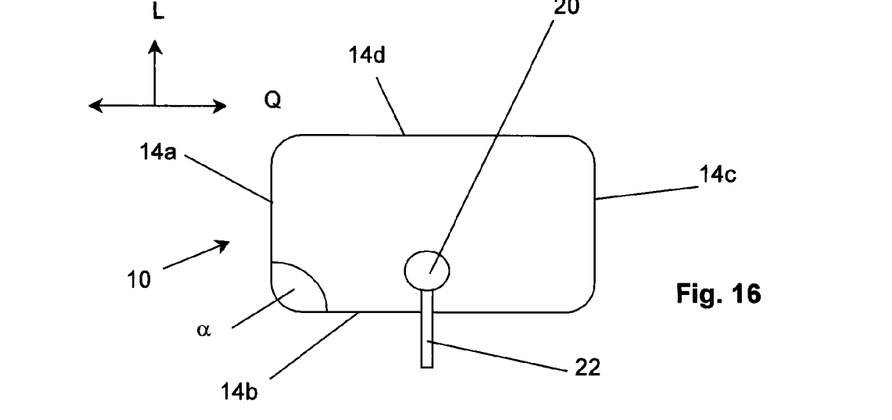
FIG. 16 shows a second embodiment of the side airbag according to the invention in a representation corresponding to FIG. 2.
Figure 17:
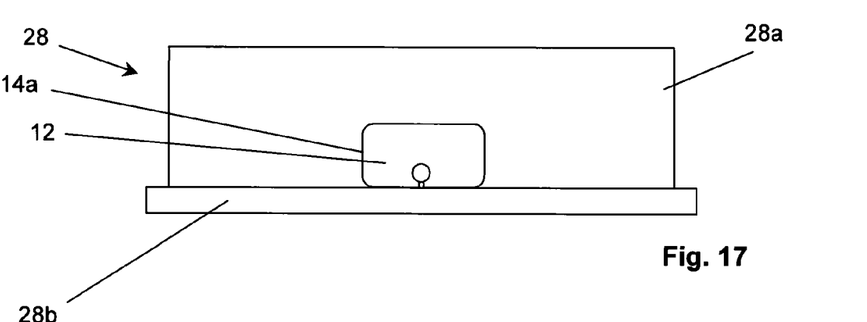
FIG. 17 shows a schematic representation of a seat bench with a side airbag represented in FIG. 16.
Figure 18:
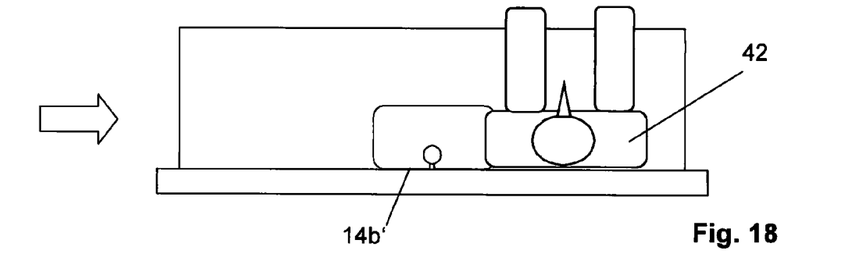
FIG. 18 shows the situation depicted in FIG. 17 in the case of an accident with a passenger on the seat bench.
Figure 19:
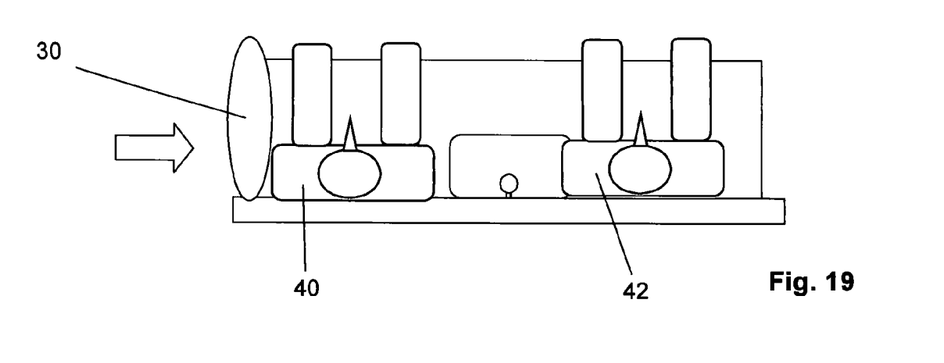
FIG. 19 shows the situation depicted in FIG. 18 with two passengers and FIGS. 20-24 show alternative possibilities as to how the desired shape of the side airbag can be generated.

FIG. 16 shows a side airbag according to a second embodiment of the invention in a representation corresponding to FIG. 2. The outer skin 12 of this side airbag 10 also comprises a lateral surface 14 and two caps 16, 18 (not represented). The shown cross-section through the outer skin 12 (which essentially corresponds to the shape of the caps) has an essentially rectangular cross-section, so that the lateral surface 12 has four side walls, namely a first side wall 14a, a second side wall 14b, a third side wall 14c and a fourth side wall 14d. The bolts 22 of the gas generator (which form the mounting device) extend through the second side wall 14b and the fourth side wall 14d extends parallel to this second side wall 14b. First side wall 14a and third side wall 14c extend parallel to one another and connect the second and fourth side wall. The second and fourth side wall extend in transverse direction Q of the motor vehicle, the first and third side wall extend in longitudinal direction L. As can be seen from FIGS. 18, 19, first and third side wall 14a, 14c virtually always form the impact surfaces, whereas the second side wall 14b forms the support surface, wherein, in the event of a vehicle impact from the left, i.e. when a passenger sitting on the right-hand side strikes the outer skin 12, i.e. the third side wall 14c, the left-hand section 14b' of the second side wall 14b essentially takes over the support function and vice versa. In contrast with the first embodiment, therefore, there is a fixed allocation of the side walls to a function.

Figure 20:
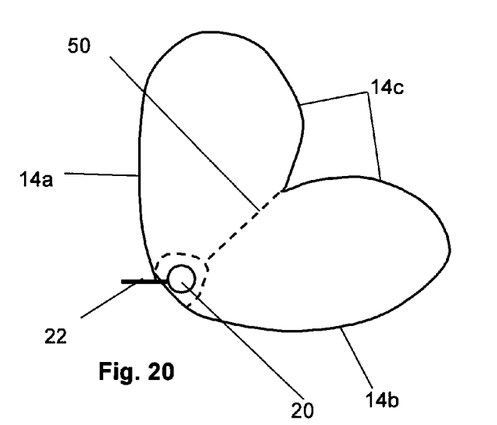
Figure 21:
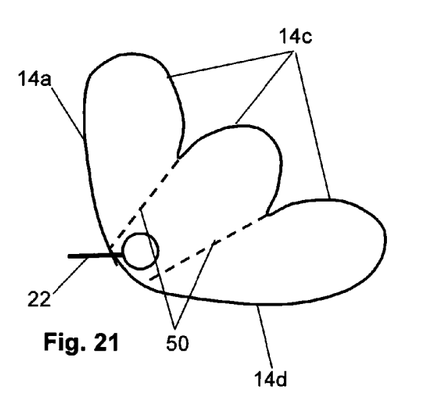

The previously described side airbags are "conventional" 3D-airbags comprising at least three cuttings, wherein the desired cross-sectional shape is generated by the caps. This is however not imperative, as is shown by way of example in FIGS. 20 to 24, wherein the representations of these figures correspond to FIGS. 2 to 5 both with respect to their cross-sectional plane and with respect to their orientation:

In the example of embodiment of FIG. 20, the desired cross-sectional shape is generated by an inner tether 50, which forces the outer skin into a heart-shaped cross-section, in such a way that the third side wall 14 is concave. Something similar is shown in FIG. 21, but with two tethers 50.

Figure 22:
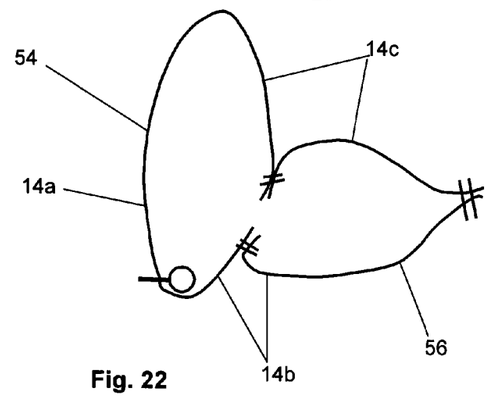
Figure 23:
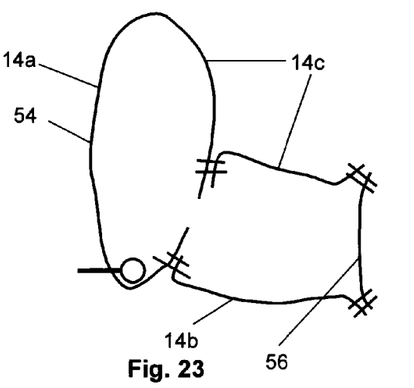

In the examples of embodiment of FIGS. 22 and 23, the desired shape (first side wall 14a extending forward and second side wall 14b extending sidewards) of the outer skin 12 is achieved by the fact that two airbag skins 54, 56 are placed one upon the other, wherein they are connected to one another by means of at least one overflow opening.

Figure 24:
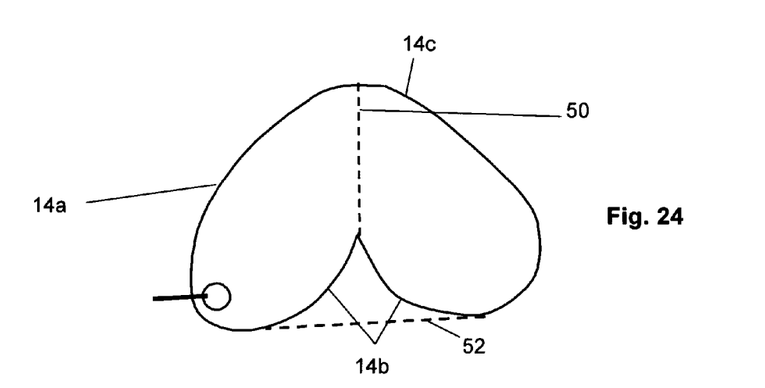

The example of embodiment of FIG. 24 is similar to the example of embodiment of FIG. 20, with the difference that here the second side wall 14b is forced into a concave shape by the inner tether 50. This means that, whilst the second side wall extends overall crosswise to the vehicle direction, not all the sections of this second side wall necessarily do so. It may be advisable in this case to provide an outer tether 52 spanning wholly or partially over the second side wall 14b. Said outer tether 52 can in a case as is shown for example in FIG. 7 also form the impact surface or a part thereof.

The described side airbags usually comprise, like airbags arranged on the outer side of a backrest too, a ventilation device, for example in the form of a ventilation opening in the outer skin. Since in some cases only a very small amount of ventilation is required (see for example FIGS. 6 and 7), but in other cases very strong ventilation is required (see for example FIGS. 10, 14 and 15), it may be advisable to provide an adaptive ventilation device, which increases its effective diameter with increasing internal pressure. Such an adaptive ventilation device can comprise for example a membrane with at least one hole. Other adaptive ventilation devices are however also known.

LIST OF REFERENCE NUMBERS 10 side airbag
12 outer skin
14 lateral surface
14a first side wall
14b second side wall
14b' left-hand section
14c third side wall
14d fourth side wall
16 first cap
18 second cap
20 gas generator
22 bolt
24 left-hand vehicle seat
24a seat cushion
24b backrest
26 right-hand vehicle seat
26a seat cushion
26b backrest
28 seat bench
28a seat cushion
28b backrest
30 left-hand side airbag
32 right-hand side airbag
40 passenger sitting on the left
42 passenger sitting on the right
50 inner tether
52 outer tether
54 first airbag skin
56 second airbag skin
L longitudinal direction of the motor vehicle
Q transverse direction of the motor vehicle

The invention claimed is:

1. A side airbag for a seat of a motor vehicle, the side airbag comprising:
   at least one mounting member for mounting of the side airbag to a lateral side of a backrest of the seat;
   an outer skin having a first side wall extending forward in relation of a longitudinal direction of the motor vehicle; and
   a second side wall connected to the first side wall, the second side wall extending basically perpendicular to the longitudinal direction of the motor vehicle when the outer skin is fully deployed and free of outer forces, such that at least a third side wall connects the first and the second side walls;
   wherein the first and second side walls both have surface normals in a horizontal plane, the first side wall extends essentially forwardly from the at least one mounting member in the longitudinal direction and the second side wall extends essentially in a vehicle transverse direction, and further wherein the first side wall inflates along a lateral side of the seat:
   wherein the first side wall directly extends from the second side wall and the second side wall extends from proximate the at least one mounting member, and
   wherein the second side wall is greater in length than the first side wall and the first and second side walls are generally planar when the outer skin is fully deployed and free of outside forces.

2. The side airbag according to claim 1, wherein the side walls of the outer skin are part of a lateral surface and wherein at an upper end and at a lower end of this lateral surface a cap made from a separate cutting is provided such that the outer skin enclosing a gas compartment consists of at least three cuttings.

3. The side airbag according to claim 1, wherein the at least one mounting member is located in a transitional area between the first and the second side walls.

4. The side airbag according to claim 1, wherein an inner angle between the first and the second side walls is at least 90° when the outer skin is fully deployed and free of outer forces.

5. The side airbag according to claim 1, wherein the first side wall extends forward in a slanting way such that it slants towards a passenger to be protected.

6. The side airbag according to claim 1, wherein the second side wall rearwardly extends in a slanted way.

7. The side airbag according to claim 1 in combination with the seat of the motor vehicle, the side airbag mounted to an inboard side of the seat.

8. The side airbag according to claim 1, in combination with the motor vehicle, the motor vehicle including two individual seats, wherein only one individual seat carries the side airbag, the side airbag located on a side of a backrest which is located on an inner side of the motor vehicle.

9. The combination according to claim 8, wherein the individual seats are adjustable such that the second side wall comes into contact with the backrest of the other individual seat.

10. The side airbag according to claim 1, wherein the at least one mounting member is located proximate an intersection of the first and second side walls.

11. The side airbag according to claim 1, further comprising a gas generator disposed within the outer skin, the at least one mounting member extending from the gas generator through the outer skin.

12. The side airbag according to claim 1, wherein the first side wall is the shortest of the first, second and third side walls.

13. The side airbag according to claim 12, wherein the outer skin has a first dimension in the longitudinal direction of the motor vehicle and a second dimension perpendicular to the longitudinal direction of the motor vehicle, the second dimension being greater than the first dimension.

14. A side airbag for a motor vehicle, the side airbag comprising:
   at least one mounting member for mounting of the side airbag to an inboard lateral side of a backrest of a seat; and
   an outer skin having first, second and third side walls, the outer skin further having an upper cap and a lower cap both oriented generally perpendicular to each of the first, second and third side walls;
   wherein the first and second side walls both have surface normals in a horizontal plane, the first side wall extends essentially forwardly from the at least one mounting member in a longitudinal direction and the second side wall extends essentially in a vehicle transverse direction and further wherein the first side wall inflates along a lateral side of the seat;
   wherein the first and second side walls are generally planar and oriented generally vertically
   wherein the first side wall directly extends from the second side wall and the second side wall extends from proximate the at least one mounting member, and
   wherein the second side wall is greater in length than the first side wall and the first and second side walls are generally planar and generally perpendicular to one another when the outer skin is fully deployed and free of outside forces.

15. The side airbag according to claim 14, wherein the at least one mounting member is located proximate an intersection of the first and second side walls.

16. The side airbag according to claim 15, wherein the second side wall extends generally perpendicular to a longitudinal direction of the vehicle.

17. The side airbag according to claim 14, further comprising a gas generator disposed within the outer skin, the at least one mounting member extending from the gas generator through the outer skin.

18. The side airbag according to claim 14, wherein the first side wall is the shortest of the first, second and third side walls.

19. The side airbag according to claim 18, wherein the outer skin has a first dimension in the longitudinal direction of the motor vehicle and a second dimension perpendicular to the longitudinal direction of the motor vehicle, the second dimension being greater than the first dimension.

20. A seating arrangement for a motor vehicle, the seating arrangement comprising:
   a first vehicle seat;
   a side airbag mounted to an inboard lateral side of a backrest of the first vehicle seat, the side airbag including:
      at least one mounting member mounting the side airbag to a lateral side of the backrest of the seat; and
      an outer skin having first, second and third vertically oriented side walls, the first side wall extending forward from the second side wall in relation to a longitudinal direction of the vehicle, the second side wall extending directly from the first side wall in a direction basically crossways to the longitudinal direction of the motor vehicle,
   wherein the second side wall is greater in length than the first side wall and the first and second side walls are generally planar when the outer skin is fully deployed and free of outside forces.

21. The seating arrangement according to claim 20, wherein an inner angle between the first and the second side walls is at least 90° when the outer skin is fully deployed and free of outer forces.

22. The seating arrangement of claim 20, further comprising a second vehicle seat laterally spaced relative to the first vehicle seat,
- wherein when the second seat only is occupied, upon inflation of the outer skin, the first side wall extends to a first backrest of the first vehicle seat and is supported on the first backrest, the second sidewall defining an impact surface for the occupant; and
- wherein when the first seat only is occupied, upon inflation of the outer skin, the second side wall extends to a second backrest of the second vehicle seat and is supported on the second backrest, the first side wall defining an impact surface for the occupant.

\* \* \* \* \*